United States Patent
Nagasaka et al.

(10) Patent No.: US 9,484,568 B2
(45) Date of Patent: Nov. 1, 2016

(54) METHOD OF MANUFACTURING LAYERED STRUCTURE CONSTITUTING ALL-SOLID-STATE BATTERY, APPARATUS FOR MANUFACTURING THE SAME, AND ALL-SOLID-STATE BATTERY PROVIDED WITH LAYERED STRUCTURE

(75) Inventors: Masahiko Nagasaka, Shinshiro (JP); Shogo Nakajima, Shinshiro (JP); Takayuki Nozawa, Shinshiro (JP); Osamu Sugino, Shinshiro (JP); Ikuto Mishima, Toyokawa (JP)

(73) Assignee: SINTOKOGIO, LTD., Nagoya-Shi, Aichi (JP)

( * ) Notice: Subject to any disclaimer, the term of this patent is extended or adjusted under 35 U.S.C. 154(b) by 373 days.

(21) Appl. No.: 13/880,240

(22) PCT Filed: Oct. 5, 2011

(86) PCT No.: PCT/JP2011/072958
§ 371 (c)(1),
(2), (4) Date: Apr. 18, 2013

(87) PCT Pub. No.: WO2012/053359
PCT Pub. Date: Apr. 26, 2012

(65) Prior Publication Data
US 2013/0209873 A1 Aug. 15, 2013

(30) Foreign Application Priority Data
Oct. 20, 2010 (JP) .................................. 2010-235691

(51) Int. Cl.
*H01M 4/82* (2006.01)
*H01M 6/00* (2006.01)
(Continued)

(52) U.S. Cl.
CPC ............. *H01M 4/04* (2013.01); *H01M 2/1673* (2013.01); *H01M 2/18* (2013.01); *H01M 4/0409* (2013.01);
(Continued)

(58) Field of Classification Search
CPC .................... H01M 10/0562; H01M 10/0585; H01M 4/0471; H01M 10/0404; H01M 4/0409; H01M 4/0402
USPC ................. 29/623.1, 623.5, 623.3, 209, 304; 156/89.12
See application file for complete search history.

(56) References Cited

U.S. PATENT DOCUMENTS 4,766,671 A * 8/1988 Utsumi et al. .................. 29/848
4,935,317 A    6/1990 Fauteux et al.
(Continued)

FOREIGN PATENT DOCUMENTS

JP    05-094829    4/1993
JP    2008-112635    5/2008
(Continued)

OTHER PUBLICATIONS

International Search Report issued by the Japanese Patent Office in International Application No. PCT/JP2011/072958, mailed Dec. 27, 2011 (4 pages).

*Primary Examiner* — Patrick Ryan
*Assistant Examiner* — Julian Anthony
(74) *Attorney, Agent, or Firm* — Finnegan, Henderson, Farabow, Garrett & Dunner, L.L.P.

(57) ABSTRACT

The present invention provides a method of manufacturing and an apparatus for manufacturing a layered structure comprising a solid electrolyte layer, a positive electrode active material layer, and a negative electrode active material layer, which together constitute an all-solid-state battery. The layered structure has concavities and convexities formed on the surface and is manufactured by the method comprising the steps of: forming a green sheet S111, where the green sheet for a solid electrolyte layer 11 is formed; forming concavities and convexities S112, where the green sheet for a solid electrolyte layer 11 and the sheet member 50 that is made from material that is caused to disappear when heated, and that has concavities and convexities, are formed in one piece, and the concavities and convexities are formed on the surface of the green sheet for a solid electrolyte layer 11; heating S113, where the sheet member 50 is caused to disappear by heating the green sheet for a solid electrolyte layer 11 and the sheet member 50 that are formed in one piece, and where the green sheet for a solid electrolyte layer 11 is sintered.

10 Claims, 6 Drawing Sheets

(51) Int. Cl.
  *H01M 4/02*      (2006.01)
  *H01M 4/13*      (2010.01)
  *H01M 10/0562*   (2010.01)
  *H01M 6/18*      (2006.01)
  *C03B 29/00*     (2006.01)
  *H01M 4/04*      (2006.01)
  *H01M 2/16*      (2006.01)
  *H01M 2/18*      (2006.01)
  *H01M 10/0525*   (2010.01)
  *H01M 10/0585*   (2010.01)
  *H01M 4/139*     (2010.01)
  *H01M 4/40*      (2006.01)
  *H01M 4/58*      (2010.01)
  *H01M 10/04*     (2006.01)

(52) U.S. Cl.
  CPC ....... *H01M 4/0471* (2013.01); *H01M 10/0525* (2013.01); *H01M 10/0562* (2013.01); *H01M 10/0585* (2013.01); *H01M 4/139* (2013.01); *H01M 4/405* (2013.01); *H01M 4/58* (2013.01); *H01M 4/5825* (2013.01); *H01M 10/0404* (2013.01); *Y02E 60/122* (2013.01); *Y02P 70/54* (2015.11); *Y02T 10/7011* (2013.01); *Y10T 29/49108* (2015.01); *Y10T 29/53135* (2015.01)

(56) References Cited

U.S. PATENT DOCUMENTS 7,410,716 B2 * 8/2008 Garner et al. ................ 429/465
7,906,234 B2 * 3/2011 Tamai et al. .................. 429/162

FOREIGN PATENT DOCUMENTS

| | | |
|---|---|---|
| JP | 2008-123954 | 5/2008 |
| JP | 2008-243735 | 10/2008 |
| JP | 2009-224318 | 10/2009 |
| JP | 2010-080118 | 4/2010 |
| JP | 2010-123463 | 6/2010 |
| WO | WO 88/10520 | 12/1988 |
| WO | 2009-070591 | 4/2009 |

* cited by examiner

METHOD OF MANUFACTURING LAYERED STRUCTURE CONSTITUTING ALL-SOLID-STATE BATTERY, APPARATUS FOR MANUFACTURING THE SAME, AND ALL-SOLID-STATE BATTERY PROVIDED WITH LAYERED STRUCTURE

CROSS REFERENCE TO RELATED APPLICATIONS

This application is a national phase application based on PCT/JP2011/072958, filed Oct. 5, 2011, which claims the priority of Japanese Patent Application No. 2010-235691, filed Oct. 20, 2010, the content of both applications of which is incorporated herein by reference.

FIELD OF THE INVENTION

This invention is directed to a method of manufacturing a layered structure selected from a solid electrolyte layer, a positive electrode active material layer, and a negative electrode active material layer, that together constitute an all-solid-state battery, an apparatus for manufacturing a layered structure, and the all-solid-state battery provided with the layered structure.

BACKGROUND ART

Recently a social demand for an environment-friendly vehicle has increased so that development is in progress of a vehicle that is not driven by an internal-combustion engine that mainly uses conventional gasoline or light oil, but a so-called hybrid electric vehicle that is driven by a combination of the internal-combustion engine and an electric motor or an electric vehicle that is driven by the electric motor. Already some of these vehicles have been put into practical use and have been on sale.

For the hybrid electric vehicle and the electric vehicle, a secondary battery that drives a motor and that can be charged and discharged is essential. But many of the conventional secondary batteries, which are represented by a lithium battery, use a liquid electrolyte. So, there are problems, such as an oil leak.

Also, although the lithium ion battery has a record in that it has often been used as an electric source for a portable device such as a laptop computer, a mobile phone, etc., it has often been reported that the lithium ion battery has caused a fire or explosion. Particularly, a secondary battery that is mounted on a vehicle is required to operate under the conditions that are harsher than those to which the secondary battery that is mounted on these portable devices is exposed. Also, no less important is that since a secondary battery that is mounted on a vehicle needs greater energy capacity, safety measure should be considered.

To meet these social demands, development of the all-solid-state battery, of which all the main components, including an electrolyte, consist of solid material, has been in progress. As the all-solid-state battery has an electrolyte that is not liquid, the chance that it will cause an oil leak, fire, or explosion is greatly reduced. Although an all-solid-state lithium secondary battery can be charged and discharged to and from a high voltage such as 3-5 volts, it has a high level of safety. This is because it adopts a non-combustible solid electrolyte (for example, see Patent Documents 1 and 2).

The technology as disclosed in Patent Documents 1 and 2 relates to a method of manufacturing involving a high cost where the method uses a vacuum vapor deposition method, laser ablation method, sputtering, etc. Also, as a method of manufacturing a solid electrolyte layer for the all-solid-state battery, a positive electrode active material layer, and a negative electrode active material layer, a method of manufacturing by compression molding of raw powder material, a method of manufacturing by screen printing, etc., are proposed.

However, the batteries manufactured by these methods have an insufficient binding force that works between adjacent layers, so that an interface resistance is likely to increase. Also, because of the movement of ions within an electrode active material in the charge- and discharge-processes, a repeated stress is caused between the layers. So, if the binding force that works between the adjacent layers is insufficient, a sufficient interfacial strength cannot be obtained. For this reason, defects such as separation of the layers occurs, which defects are likely to lower the capacity of the batteries or to shorten the lives of the batteries.

To solve these problems an all-solid-state battery is proposed wherein the first electrode and the second electrode are formed by screen printing, etc., and then the first electrode and the second electrode are sintered by a hot-pressing method or a hot-isostatic pressing (HIP) method, thereby lowering the interfacial reaction resistance by increasing the interfacial area between the electrode active material and the solid electrolyte (for example, see Patent Document 3).

PRIOR-ART DOCUMENTS

Patent Documents

Patent Document 1: Publication of Japanese patent application, Publication No. 2008-112635
Patent Document 2: Publication of Japanese patent application, Publication No. 2009-70591
Patent Document 3: Publication of Japanese patent application, Publication No. 2009-224318
Patent Document 4: Publication of Japanese patent application, Publication No. H05-94829

SUMMARY OF THE INVENTION

Problem to be Solved by the Invention

However, in the hot-pressing method and the hot-isostatic pressing method, the pressing is carried out at a high temperature and under high pressure. So, there were problems in that equipment used for these methods was large and costly, that it usually took a longer time to complete a process, and that thus the cost for manufacturing became greater.

In the technical field of a fuel battery, a method to strengthen the interfacial binding at a low cost is disclosed, for example, in Reference 4, where a solid electrolyte layer has an increased interfacial area by having concavities and convexities formed on the interfacial surface and where the concavities and convexities are press-formed by using a metal die having rings of concentric and wavy shapes.

However, for manufacturing the all-solid-state battery, each layer such as the solid electrolyte layer, etc., is formed to be thin. So, when a green sheet is press-formed, it bites into the metal die or sticks to the metal die such that it sometimes cannot be separated from the metal die and it is damaged, resulting in a lower yield rate.

In view of the above problems, the present invention provides a method of manufacturing a layered structure and an apparatus for manufacturing a layered structure where the layered structure that is selected from a solid electrolyte layer, a positive electrode active material layer, and a negative electrode active material layer, which together constitute an all-solid-state battery, enables the interfacial resistance to be lowered, enables the interfacial strength to be increased, enables an improved yield rate, and enables a low manufacturing cost.

Means to Solve Problems

To solve the above problems, the first invention uses a technical means where a method is provided of manufacturing a layered structure that is selected from a solid electrolyte layer, a positive electrode active material layer and a negative electrode active material layer, that together constitute an all-solid-state battery, the method comprising the steps of:
forming a green sheet where slurry is prepared that comprises materials constituting the layered structure that is selected and the green sheet is formed;
forming concavities and convexities on the surface of the green sheet where (1) the green sheet that was formed in the step of forming a green sheet and (2) a sheet member that is made up of material that is caused to disappear when heated, and that has concavities and convexities, are formed in one piece, and the concavities and convexities are formed on the surface of the green sheet; and
heating the green sheet and the sheet member that are formed in one piece in the step of forming concavities and convexities, where the sheet member is caused to disappear by heating and where the green sheet is sintered.

According to the first invention, the layered structure can be manufactured by the method having the following steps:
in the step of forming a green sheet, slurry is prepared that comprises materials constituting the layered structure that is selected and the green sheet is formed;
in the step of forming concavities and convexities, (1) the green sheet and (2) the sheet member that is made up of material that is caused to disappear when heated, and that has concavities and convexities, are formed in one piece, and the concavities and convexities are formed on the surfaces of the green sheet; and
in the step of heating, the green sheet and the sheet member that are formed in one piece are heated where the sheet member is caused to disappear and where the green sheet is sintered. In this way, in manufacturing the all-solid-state battery the interface between the layered structure that is selected and the adjoining layered structure can be formed to have concavities and convexities so that the interfacial area can be increased, and at the same time an anchor effect is produced and thus the interfacial strength can be improved. So, the layered structure that prevents the layers from being separated from each other at the interface can be provided. Also, because the interfacial area can be increased, a layered structure that has less interfacial resistance can be provided. Also, because the green sheet and the sheet member are formed in one piece and no parting of the metal die from the green sheet is necessary after the concavities and convexities are imparted on the surface of the green sheet, causing no cracking of the green sheet, which otherwise would happen if it were to be parted from the metal die. So, there is no fear that the yield rate would be lowered.

Further, the sheet member supports the green sheet and enables easy handling of the green sheet. So, there is no fear that the yield rate would be lowered because of possible cracking of the green sheet. Also, the steps of this manufacturing method are easy to perform, so that the cost for manufacturing can be reduced.

The second invention uses a technical means where the sheet member in the method of manufacturing a layered structure of the first invention is made from resin materials.

As in the second invention if the sheet member is made from the resin materials, then the concavities and convexities can be accurately formed on the green sheet. This is because the resin materials have moderate hardness and strength. Also, the concavities and convexities can be easily formed to desired shapes and the handling of the green sheet is easy.

The third invention uses a technical means where in the method of manufacturing a layered structure of the first or second invention the green sheet and the sheet member are formed in one piece by the sheet member being pressed onto the green sheet in the step of forming concavities and convexities.

According to the third invention, as the green sheet and the sheet member are formed in one piece by the sheet member being pressed onto the green sheet in the step of forming concavities and convexities, to form the concavities and convexities on the green sheet can firmly be carried out by a simple means for pressing, such as using a roll press or a belt press.

The fourth invention uses a technical means where in the method of manufacturing a layered structure of any of first to third inventions the green sheet is manufactured by a doctor blade method in the step of forming a green sheet.

As in the fourth invention, if the doctor blade method is used in the step of forming a green sheet, a relatively thick film can be uniformly formed. So, the method is desirable.

The fifth invention uses a technical means where in the method of manufacturing a layered structure of the fourth invention the sheet member is a carrier sheet that is used in the doctor blade method.

According to the fifth invention, as the carrier sheet that is used in the doctor blade method is used as the sheet member, forming the green sheet and forming the concavities and convexities on the green sheet can be carried out simultaneously. The steps of forming a green sheet and of forming concavities and convexities are simultaneously carried out, so that the method is efficient. Also, it is not necessary to prepare a separate sheet member. So, the manufacturing cost can be reduced.

The sixth invention uses a technical means where in the method of manufacturing a layered structure of any of the first to fifth inventions the concavities and convexities formed on the surface of the green sheet have an undercut shape.

According to the sixth invention, because the concavities and convexities formed on the surface of the green sheet have an undercut shape, they will further improve the anchor effect and also improve the interfacial strength. Moreover, this undercut shape cannot be formed by another manufacturing method.

The seventh invention uses a technical means where the all-solid-state battery comprises the layered structure manufactured by the method of manufacturing a layered structure of any of the first to sixth inventions.

As in the seventh invention, the all-solid-state battery that comprises the layered structure that is manufactured by the method of manufacturing a layered structure of the present invention can be one that has an improved interfacial strength, that is highly reliable, and that has a high performance with reduced interface resistance.

The eighth invention uses a technical means where an apparatus for manufacturing a layered structure that is selected from the solid electrolyte layer, the positive electrode active material layer, and the negative electrode active material layer, which together constitute the all-solid-state battery, comprises a device for forming concavities and convexities, which means forms in one piece (1) a green sheet that is to form material that constitutes the layered structure that is selected and (2) a sheet member that is made from material that is caused to disappear when heated, and that has concavities and convexities, and which device forms the concavities and convexities on the surface of the green sheet.

According to the eighth invention, the apparatus for manufacturing a layered structure forms, by the device for forming concavities and convexities in one piece, (1) a green sheet that is to constitute material that constitutes the layered structure that is selected and (2) a sheet member that is made from material that is caused to disappear when heated, and that has concavities and convexities, and which device forms the concavities and convexities on the surface of the green sheet. In this way, in manufacturing the all-solid-state battery the interface between the layered structure that is selected and the adjoining layered structure can be formed to have concavities and convexities, so that the adhesion strength between the layers can be increased. Thus the layered structure that can prevent the separation of the layers at the interface can be provided. Also, as the apparatus for manufacturing a layered structure of the present invention can produce an increased interface area, it can provide a layered structure that can reduce the interfacial resistance. Further, as the apparatus for manufacturing a layered structure of the present invention forms the green sheet and the sheet member in one piece, it does not need a step of parting the metal die after forming the concavities and convexities on the surface of the green sheet. So, there is no fear that the yield rate would be lowered, because the green sheet and the sheet member are formed in one piece and no parting of the metal die from the green sheet is necessary after the concavities and convexities are imparted on the surface of the green sheet, thus causing no cracking of the green sheet when it otherwise would happen were it to be parted from the metal die. Further, the sheet member supports the green sheet, thereby enabling easy handling of the green sheet. So, there is no fear that the yield rate would lowered, because there would be no cracking of the green sheet.

The ninth invention uses a technical means where the device for forming concavities and convexities of the apparatus for manufacturing a layered structure of the eighth invention forms the green sheet and the sheet member in one piece by pressing the sheet member to the green sheet.

According to the ninth invention, as the green sheet and the sheet member are formed in one piece by having the sheet member pressed to the green sheet in the step of forming concavities and convexities, forming the concavities and convexities on the green sheet can be carried out by a simple device for pressing such as a roll press, belt press, etc. Also, the cost of the apparatus can be reduced.

The tenth invention uses a technical means where the apparatus for manufacturing a layered structure of the eighth invention comprises a device for forming a green sheet, which device forms the green sheet by the doctor blade method where the sheet member used in the method is a carrier sheet that is used in the doctor blade method.

According to the tenth invention, as the carrier sheet that is used in the doctor blade method is used as the sheet member, the concavities and convexities can be formed at the same time that the green sheet is formed. Thus the step of forming the green sheet and that of forming the concavities and convexities can be carried out at the same time. So, the apparatus for manufacturing a layered structure of the tenth invention can be efficiently operated. The apparatus for manufacturing a layered structure of the tenth invention does not need to use a separate sheet member and thus the cost for manufacturing can be reduced.

EMBODIMENT OF CARRYING OUT THE INVENTION

Figure 1:
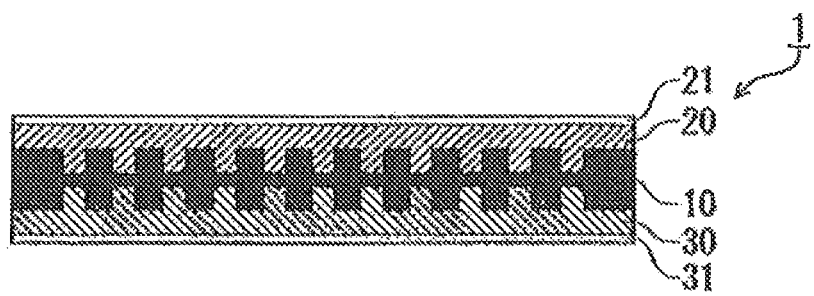
FIG. 1 is a schematic view showing a cross-section of the all-solid-state battery.

The method of manufacturing a layered structure, the apparatus for manufacturing a layered structure, and the all-solid-state battery comprising the layered structure, of the present invention, are explained by referring to the drawings.

As shown in the schematic view of FIG. 1, the all-solid-state battery 1 comprises the solid electrolyte layer 10, the positive electrode active material layer 20, and the negative electrode active material layer 30, as layered structures, where the positive electrode active material layer 20 and the negative electrode active material layer 30 are disposed so that they sandwich the solid electrolyte layer 10, and where the positive electrode active material layer 20 is electrically connected to a current-collector layer for a positive electrode 21 and the negative electrode active material layer 30 is electrically connected to a current-collector layer for a negative electrode 31.

For materials that constitute the solid electrolyte layer 10, materials such as the solid electrolyte of a sulfide system or an oxide system, both of which have a high lithium-ion conductive property, and that can be formed into a sheet, and that have been used for the solid electrolyte layer in the field of batteries, can suitably be used. For example, the following materials can be used: $Li_3PO_4$, LiPON (lithium phosphorus oxynitride glass), $Li_2S$—$SiS_2$, $Li_2S$—$P_2S_5$, $Li_2S$—$B_2S_3$, $Li_xLa_yTiO_3$ ($0 \leq x \leq 1$, $0 \leq y \leq 1$), $Li_{1+x}Al_xGe_{2-x}(PO_4)_3$ ($0 \leq x \leq 1$), $3Li_{1+x}Al_xTi_{2-x}(PO_4)_3$ ($0 \leq x \leq 1$).

The interfaces between the solid electrolyte layer 10 and the positive electrode active material layer 20, and between the solid electrolyte layer 10 and the negative electrode active material layer 30, are both formed in concavities and convexities. By having the interfaces formed in the concavities and convexities, each interface area can be increased and a higher anchor effect is produced. So, the interfacial strength can be improved, and the separation of layers at the interface can be prevented. Thus the highly reliable all-solid-state battery 1 can be obtained. Also, because the interface area can be increased, the all-solid-state battery 1 having high performance can be obtained.

The materials that are used for the positive electrode active material layer in the field of batteries can be used as materials that constitute the positive electrode active material layer 20. For example, the positive electrode active material layer of the oxide system such as $LiCoO_2$, $Li_xV_2(PO_4)_3$ ($1 \leq x \leq 5$), etc., or that of the sulfide system such as $Li_2S$, etc., can suitably be used.

The materials that are used for the negative electrode active material layer in the field of batteries can be used as materials that constitute the negative electrode active material layer 30. For example, carbon material and carbon graphite system material such as carbon or graphite, etc., an oxide system material such as an oxide of Sn, an oxide of In, an oxide of Pb, an oxide of Ag, an oxide of Sb, an oxide of Si, $Li_4Ti_5O_{12}Li_xV_2(PO_4)_3$ ($1 \leq x \leq 5$), etc., metal material such as Li, In, Al, Si, Sn, etc., or an alloy of metal materials comprising these metals as main components, and materials of a lithium metal compound such as LiAl, LiZn, $Li_3Bi$, $Li_3Cd$, $Li_3Sd$, $Li_4Si$, $Li_{4.4}Pb$, $Li_{4.4}Sn$, $Li_{0.17}C(LiC_6)$, $Li_3FeN_2Li_{2.6}CO_{0.4}N$, $Li_{2.6}Cu_{0.4}N$, etc., can suitably be used.

Materials that are electrically conductive, such as carbon, can be added to the positive electrode active material layer 20 and the negative electrode active material layer 30 to improve the movement of electrons within each electrode active material.

The materials that are used for current-collector layer in the field of battery can be used as materials that form the current-collector layer for a positive electrode 21 and the current-collector layers for a negative electrode 31. A plate-like member, foil, powder compact, film, etc., made from metals, such as Pt, Au, Ag, Cu, Al, Fe, Ni, Ti, In, Zn, etc., or metallic materials such as alloy metals comprising these metals as the main components, can suitably be used.

Figure 2:
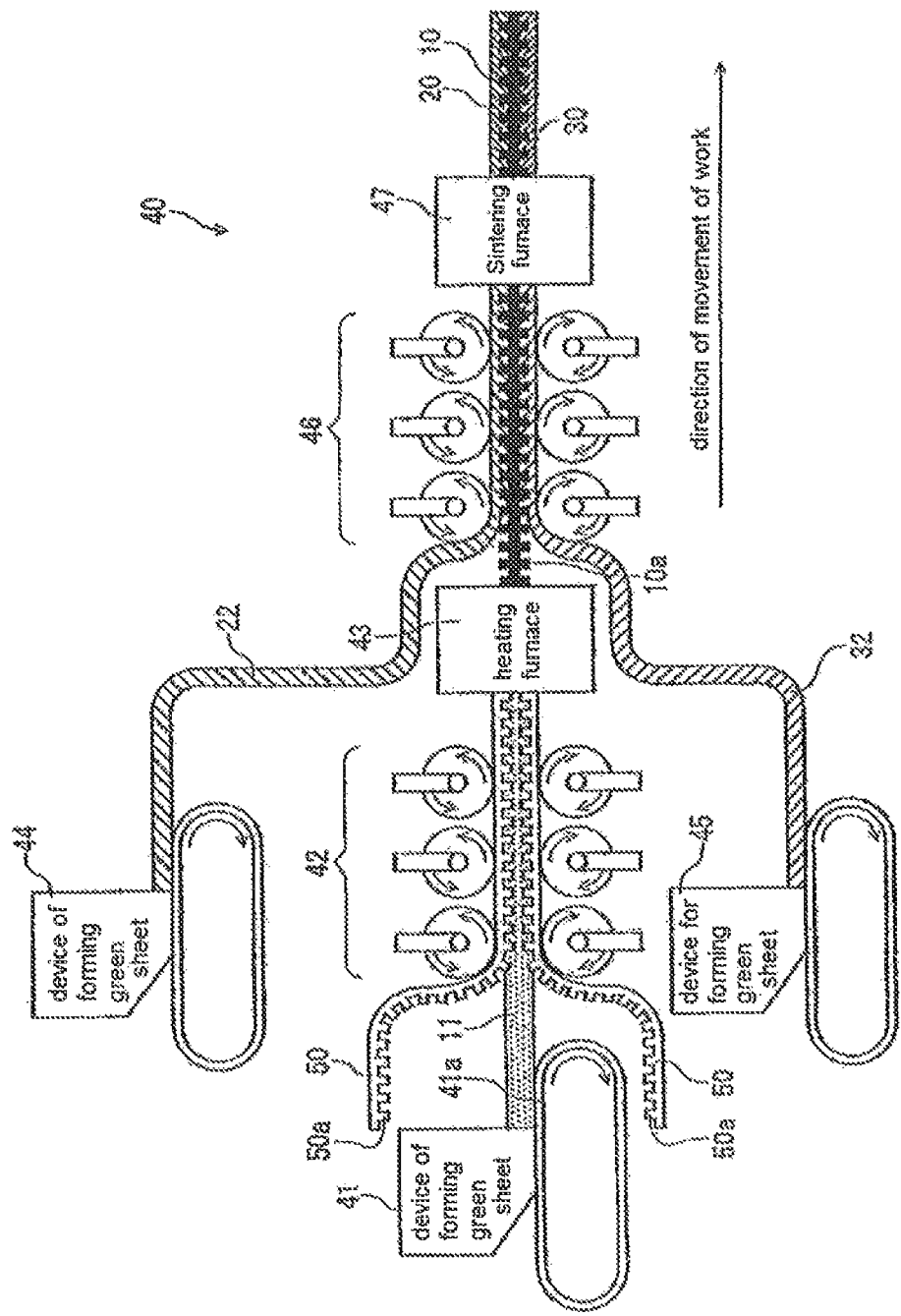
FIG. 2 is a schematic view showing the apparatus for manufacturing a layered structure.

Next, the method of manufacturing the all-solid-state battery is explained, focusing mainly on the steps of manufacturing the solid electrolyte layer 10. The apparatus for manufacturing the all-solid-state battery 40 and the steps of manufacturing a layered structure of a solid electrolyte layer 10a are given in FIGS. 2 and 4, respectively.

The apparatus for manufacturing the all-solid-state battery 40 comprises:
 a device for forming a green sheet for a solid electrolyte 41 that is to manufacture a green sheet for a solid electrolyte;
 a device for forming concavities and convexities (in the present embodiment a pressing device 42 is used), which device forms the green sheet for a solid electrolyte and the sheet member in one piece and forms concavities and convexities on the surfaces of the green sheet for a solid electrolyte;
 a heating furnace 43 that heats the green sheet for a solid electrolyte and the sheet member that were formed in one piece;
 a device for forming a green sheet for positive electrode active material 44 that manufactures a green sheet for positive electrode active material;
 a device for forming a green sheet for negative electrode active material 45 that manufactures a green sheet for negative electrode active material;
 a laminating equipment 46 that stacks the layered structure of a solid electrolyte layer, the green sheet for positive electrode active material, and the green sheet for negative electrode active material and then forms them in one piece; and
 a sintering furnace 47 that heats a laminated body that was formed in one piece.

The device for forming a green sheet for a solid electrolyte 41, the device for forming concavities and convexities, and the heating furnace 43 are the main components of the apparatus for manufacturing a layered structure of the solid electrolyte layer.

Figure 3:
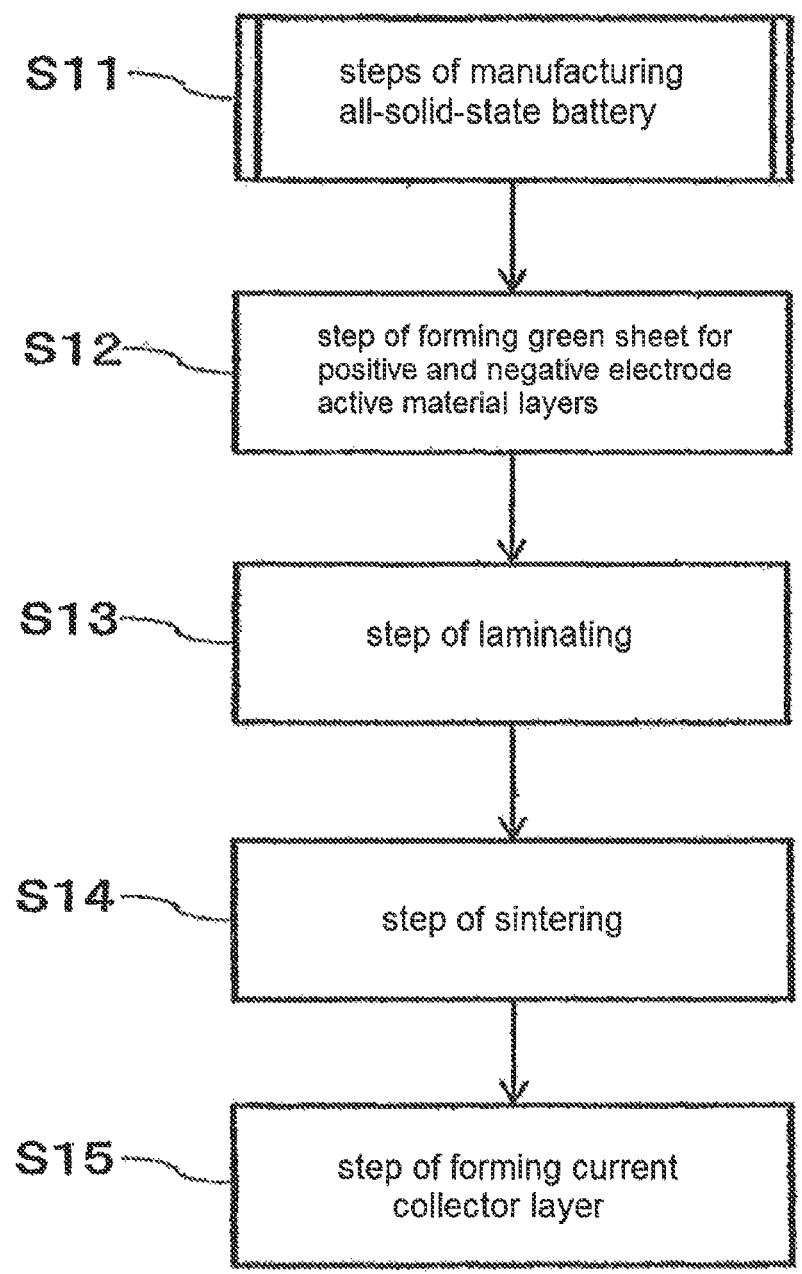
FIG. 3 shows the steps of manufacturing the all-solid-state battery.
Figure 4:
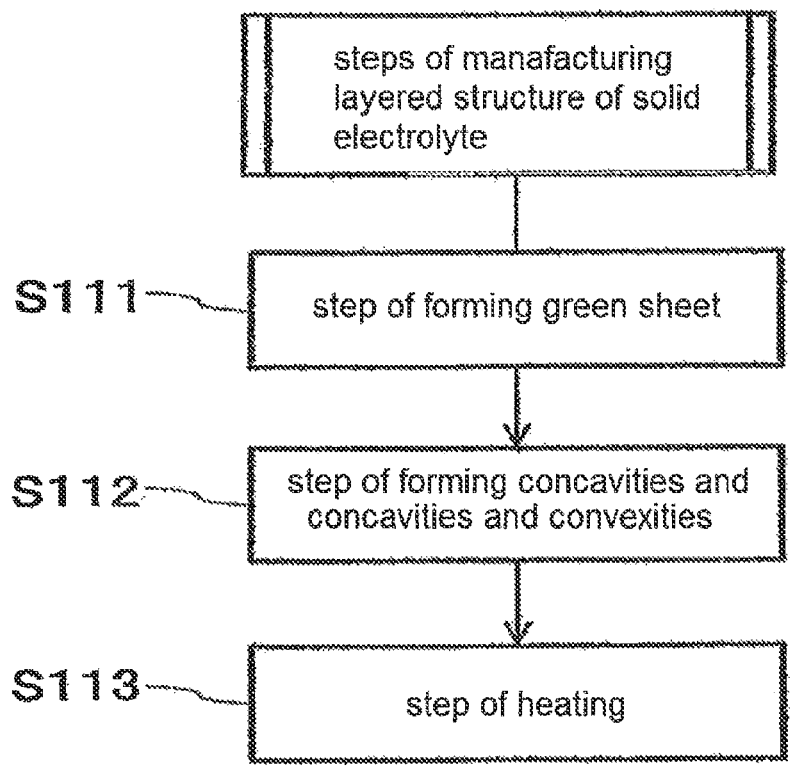
FIG. 4 shows the steps of manufacturing the structure of a solid electrolyte layer.

We now explain the steps of manufacturing the all-solid-state battery 1, as shown in FIGS. 3 and 4. First of all, in the sub-step of forming a green sheet S111 of the step of manufacturing a layered structure of a solid electrolyte layer S11, slurry is produced by having a solvent, a binder, a dispersant, etc., added to the solid electrolyte in powder form. Then the slurry is formed into a shape of sheet with the device for forming a green sheet for solid electrolyte 41 and a green sheet for a solid electrolyte 11 is manufactured. As a method for forming the sheet, a publicly known method, such as a doctor blade method, a reverse roll coating method, etc., can be used. Among these, the doctor blade method, which can uniformly form a relatively thick film, is preferred. The thickness of the green sheet for a solid electrolyte 11 can be decided depending on the properties of the all-solid-state battery, including the force of the press and possible shrinking by sintering the green sheet. For example, the thickness of the green sheet is adjusted to be in 10-500 μm and the thickness for the layered structure of a solid electrolyte layer that is finally manufactured is adjusted to be 1-100 μm.

Then in the sub-step of forming concavities and convexities S112, the device for forming concavities and convexities forms the concavities and convexities on the surfaces of the green sheet for a solid electrolyte 11.

Figure 5:
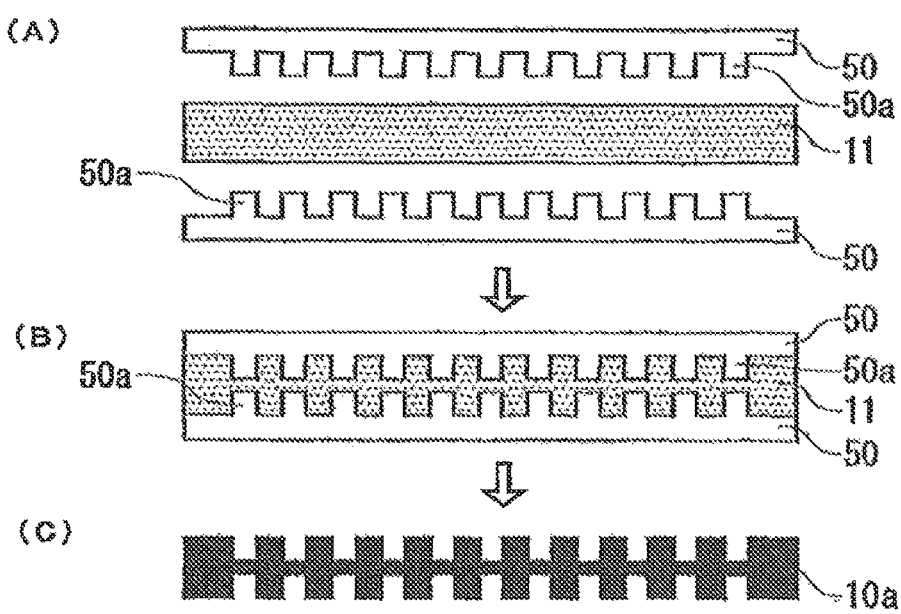
FIG. 5 is a schematic view showing the steps of manufacturing a layered structure of a solid electrolyte layer.

The sheet members 50, each of which has the concavities and convexities formed on the surface, as shown in FIG. 5(A), are supplied to the device for forming concavities and convexities, and one sheet member is each placed on each side of the green sheet for a solid electrolyte 11 that was transported by the carrier sheet 41a. Then the sheet members 50 are pressed to the green sheet by a pressing device. By this process, as shown in FIG. 5(B), the green sheet for a solid electrolyte 11 and the sheet members 50 are formed in one piece, whereby the convex parts 50a of the sheet members 50 impart and form the concavities and convexities on each side of the green sheet for a solid electrolyte 11, corresponding to the concavities and convexities of the sheet members 50. In this way forming the concavities and convexities on the green sheet for a solid electrolyte 11 can be carried out easily and firmly by the pressing device that presses the sheet members 50. In the present embodiment a roll press is used as the pressing device.

The sheet member 50 is made from material that disappears when heated, such as a film of an organic compound. The film of the organic compound comprises preferably elements C, H, and O as the main components, such that synthetic resins, such as ones made from polyvinyl alcohol, acrylic resin, polyethylene, polycarbonate, etc., can be used. The sheet member 50 made from resin material has a moderate hardness and strength. So, the concavities and convexities can be precisely formed on the green sheet for a solid electrolyte 11. Also, the concavities and convexities can be easily formed into desired shapes and the handling of the green sheet is easy. Also, sheet members made from paper, wood, etc., can be used.

The thickness of the sheet member 50 is appropriately determined corresponding to the materials and the thickness of the green sheet 11. The thinnest part of the sheet member 50 is preferably about 10 μm-500 μm thick. This is because if the thickness of the thinnest part is too small, the sheet member 50 cannot play a role of strengthening the green sheet, while, on the other hand, if the thickness of the thinnest part is too great, more time is required to have the sheet member 50 disappear, and so the consumption of fuel gas increases, etc.

In the present embodiment, the sheet member 50 when seen at a cross section in the plane that is set vertically along the direction of movement of the sheet member or the sheet member 50 when seen at a cross section in the plane that is set vertically in the direction that is perpendicular to the movement of the sheet member, each has a shape of a striped pattern that consists of rectangles. The height of the convex part 50a of the sheet member 50 can suitably be adjusted corresponding to the material and the thickness of the green sheet for a solid electrolyte 11. It preferably is about 1-200 μm. If the height of the convex part 50a is too small, to have the concavities and convexities formed on the green sheet for a solid electrolyte 11 is difficult, while if the height of the convex part 50a is too great, a problem occurs such as to cause the convex part 50a to pierce the green sheet for a solid electrolyte 11 and to damage the green sheet.

The pressure-load by the device for forming concavities and convexities that works on the green sheet for a solid electrolyte 11 and the sheet member 50 is preferably 100-8000 kgf/cm$^3$. The pressure-load should be one so that the layered structure of a solid electrolyte layer that is manufactured as a final product has a sufficient density and that at the same time the pressing device should not be oversized. Also, the time for pressing is preferably about 1-300 seconds. If the time for pressing is too short, forming concavities and convexities is not sufficiently performed and the density of the green sheet for a solid electrolyte 11 is not improved. Also, if the time for pressing is too long, it increases a cycle time, resulting in an increase of manufacturing cost.

When the sub-step of forming concavities and convexities S112 is complete, (1) the green sheet for a solid electrolyte 11 and (2) the sheet member 50 that are formed in one piece are transferred from the device for forming concavities and convexities to the heating furnace 43. No parting of the metal die from the green sheet is necessary after the concavities and convexities are imparted on the surface of the green sheet for a solid electrolyte 11. So, there is no fear that the yield rate would be lowered, because no cracking of the green sheet would be caused because no parting from the metal die would occur. Further, the sheet member 50 supports the green sheet for a solid electrolyte 11, thereby enabling easy handling of the green sheet. So, there is no fear that the yield rate would be lowered because of the cracking of the green sheet.

In the heating sub-step S113 that follows, (1) the green sheet for a solid electrolyte 11 and (2) the sheet member 50 that were formed in one piece in the sub-step of forming concavities and convexities, are heated in the heating furnace 43, where the sheet member 50 is caused to disappear and then the green sheet for a solid electrolyte 11 is sintered. Thus, as shown in FIG. 5(C), the layered structure of a solid electrolyte layer 10a that has the concavities and convexities formed on both the surfaces can be manufactured.

Conditions for sintering the green sheet for a solid electrolyte 11 can be selected depending on the materials that constitute the green sheet for a solid electrolyte 11 and the thickness of the green sheet for a solid electrolyte 11. For example, the temperature for sintering can be about 600-2,000° C. and the time for sintering can be 15-80 hours, including the process of heating-up and cooling-down.

Alternatively, to have the sheet member 50 disappear first and then to have the green sheet for a solid electrolyte 11 sintered at a later step can be selected. If the film of the organic compound is used as the sheet member 50, the temperature for heating, at which the sheet member 50 is caused to disappear, may be, for example, about 600° C. The atmosphere for heating can be selected depending on the material of the sheet member 50.

In the heating of sub-step S113 the sheet member 50 can only be caused to disappear, while in step of sintering S14, which is explained later, the layered structure of a solid electrolyte layer 10a can be sintered at the same time that the green sheet for positive electrode active material 22 and the green sheet for negative electrode active material 32 are sintered. But if the structural strength of the layered structure of a solid electrolyte layer 10a before it is sintered is not sufficiently great, it is preferable that the treatment up to the sintering be completed in the heating sub-step S113.

In the step of forming a green sheet for positive electrode active material and for negative electrode active material S12 that follows, the green sheet for a positive electrode active material 22 is manufactured by the device for forming a green sheet for positive electrode active material 44 and the green sheet for an negative electrode active material 32 is manufactured by the device for forming a green sheet for negative electrode active material 45.

In the step of laminating S13 that follows, the green sheet for positive electrode active material 22 is supplied on one surface of the layered structure of a solid electrolyte layer 10a, and the green sheet for negative electrode active material 32 is supplied on the other surface of the layered structure of a solid electrolyte layer 10a, and they are laminated and formed in one piece by the laminating equipment 46. Thus the green sheet for positive electrode active material 22 and the green sheet for negative electrode active material 32 enter and fit in the concavities and convexities on each surface of the layered structure of a solid electrolyte layer 10a, whereby the interfaces having concavities and convexities are formed. The pressure-load that is charged on each layer by the laminating equipment 46 is preferably 100-8,000 kgf/cm$^3$. This pressure-load should be one that, for one thing, can give a sufficient density to the positive electrode active material layer and the negative electrode active material layer that are finally manufactured and can give sufficient adhesion between the layers, and that, for another, is not to have the pressing device unnecessarily oversized. Also, preferably the time for pressuring is 1-300 seconds. If the time for pressuring were too short, sufficient adhesion between the layers could not be obtained. If the time for pressuring were too long, the cycle time would be longer and the manufacturing cost would be higher.

In a step of sintering S14 that follows, the laminated body that was obtained in the step of laminating S13 is heated and sintered in the sintering furnace 47 under the predetermined conditions. Then the laminated body that is made of the solid electrolyte layer 10, the positive electrode active material layer 20, and the negative electrode active material layer 30 is manufactured.

In the following step of forming a current-collector layer S15, after the laminated body that was manufactured in the step of sintering S14 is treated so as to form the predetermined shape, a current-collector layer 21 of the positive electrode is formed on the surface of the positive electrode active material layer 20 and a current-collector layer 31 of the negative electrode is formed on the surface of the negative electrode active material layer 30. Each current-collector layer can be manufactured by a publicly known method such as a method of gluing a plate-like member, foil, etc., a deposition method, sputtering method, thermal spraying method, etc. The order of the step of sintering S14 and the step of forming a current-collector layer S15 can be reversed.

The all-solid-state battery 1 is manufactured when the above steps are completed. The all-solid-state battery of the present invention can suitably be used, without limiting the use to those given herein, as a battery (hybrid battery power source) that is combined with another battery such as all-solid-state lithium battery, battery for portable equipment, built-in battery for IC card, battery for medical equipment for implant, a photovoltaic cell, and a fuel cell.

Modified Embodiment

In the above embodiment the concavities and convexities were formed on both sides of the green sheet for a solid electrolyte 11. But the concavities and convexities can be formed on only one side of the green sheet for a solid electrolyte 11.

The green sheet for positive electrode active material 22 and the sheet member 50 that has the concavities and convexities formed on the surface are formed in one piece. Then by having the sheet member 50 disappear by heating the jointed body of the green sheet for positive electrode active material 22 and the sheet member 50 that is formed in one piece, the layered structure of the positive electrode active material layer 20 that has the concavities and convexities formed on the surface is formed. Similarly, the green sheet for negative electrode active material 32 and the sheet member 50 that has the concavo-convex shapes formed on the surface are formed in one piece. Then by having the sheet member 50 disappear by heating the jointed body that is formed in one piece, the layered structure for the negative electrode active material layer 30 that has the concavities and convexities formed on the surface is formed.

When the green sheet for positive electrode active material 22 and the sheet member 50, or the green sheet for negative electrode active material 32, and the sheet member 50 are formed in one piece, as in the method of manufacturing a layered structure of a solid electrolyte layer 10a, the green sheet for positive electrode active material 22 and the sheet member 50, or the green sheet for negative electrode active material 32, and the sheet member 50 can be pressed by the pressing device (for example, a roll press) and formed in one piece.

As described above, the method of manufacturing a layered structure of a solid electrolyte layer 10a, can be applied to manufacturing a layered structure constituting the positive electrode active material layer 20 and to manufacturing a layered structure constituting the negative electrode active material layer 30. That is, to form the concavo-convex shapes on the joint interface between the solid electrolyte layer 10 and the positive electrode active material layer 20 or on the joint interface between the solid electrolyte layer 10 and the negative electrode active material layer 30 or on both of them, or to form the concavities and convexities on the joint interface between the positive electrode active material layer 20 and the current-collector layer for positive electrode 21 or on the joint interface between the negative electrode active material layer 30 and the current-collector layer for negative electrode 31 or on both of them, the method of manufacturing a layered structure of a solid electrolyte layer 10a can be applied to the step of manufacturing a layered structure constituting the positive electrode active material layer 20 that has the concavities and convexities formed on the surface or to the step of manufacturing a layered structure constituting the negative electrode active material layer 30 that has the concavities and convexities formed on the surface or to the steps of manufacturing both the layered structures. If the concavities and convexities are formed on the joint surface between the solid electrolyte layer 10 and the positive electrode active material layer 20 and on the joint surface between the solid electrolyte layer 10 and the negative electrode active material layer 30, then the interfaces on the solid electrolyte layer 10 have the concavities and convexities. So, the effect that is similar to one produced in the above-stated embodiment can be obtained. If the concavities and convexities are formed on the joint surface between the positive electrode active material layer 20 and the current-collector layer for positive electrode 21 and on the joint surface between the negative electrode active material layer 30 and the current-collector layer for negative electrode 31, each interface between the current-collector layer and the active material layer has the concavities and convexities formed on it. So, the interfacial strengths on the interfaces are increased and the interfacial resistances are reduced. The thickness of the green sheet for positive electrode active material and that of the green sheet for negative electrode active material are adjusted to be in the range of about 10-2,000 μm as a green sheet and the thickness of the layered structure that is finally manufactured is adjusted to be in the range of 1-1,000 μm. Also, for the same reason as in the green sheet for a solid electrolyte 11, the sheet member 50 preferably has a thickness of about 10-500 μm at its thinnest part and the height of the convex part 50a preferably is about 1-200 μm. The concavities and convexities on the joint surface between the solid electrolyte layer 10 and the positive electrode active material layer 20, and on the joint surface between the solid electrolyte layer 10 and the negative electrode active material layer 30, can either be formed on the solid electrolyte layer 10 as stated in the embodiment or on the positive electrode active material layer 20 and the negative electrode active material layer 30, as specified in Paragraph 0062.

Figure 6:
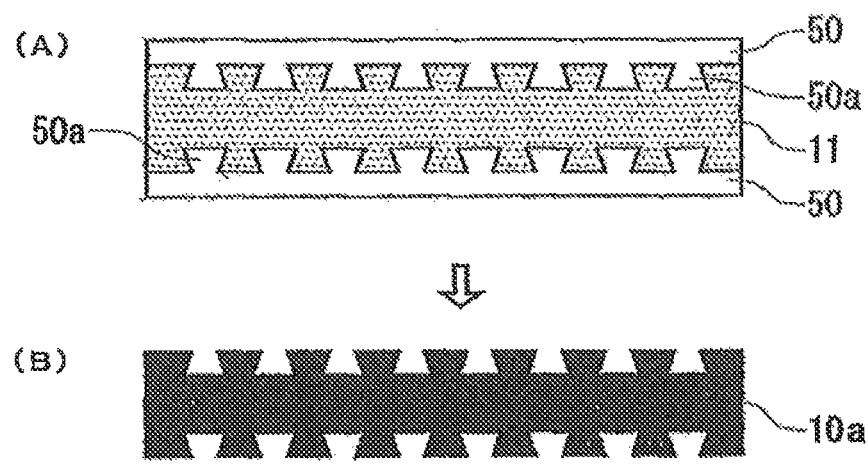
FIG. 6 shows a cross sectional view of an example of modified concavities and convexities that are formed on the layered structure.

The concavities and convexities that should be formed on the layered structure can be one of the shapes other than the rectangle as given in the embodiment, such as a dot, a wavy shape, etc., depending on the need. For example, the concavities and convexities can be those having the undercut shapes as shown in FIG. 6(B) that are produced using the sheet member 50 of FIG. 6(A). The concavities and convexities having these undercut shapes can have an improved anchor effect, thus further increasing the interfacial strength. Also, this undercut shapes cannot be produced by a method other than the above method.

FIG. 3 shows the apparatus which consecutively carries out the step of forming the green sheet for positive electrode active material and the green sheet for a negative electrode active material S12, the step of laminating S13, and the step of sintering S14. But the apparatus can be constituted so that each step can be carried out in a batch method.

An intermediate layer can be provided between the solid electrolyte layer 10 and the positive electrode active material layer 20, and between the solid electrolyte layer 10 and the negative electrode active material layer 30, so as to reduce the interfacial resistance or the stress. As the intermediate layer, a functionally gradient material layer comprising the material for the solid electrolyte layer, the positive electrode active material, and the negative electrode active material, can be used. Alternatively, a layer of material that has conductive elements such as Pt, Au, Ag, Cu, Al, Fe, Ni, Ti, In, Zn, C, etc., added to and dispersed in the material for solid electrolyte, the positive electrode active material, and the negative electrode active material, can be used.

EXAMPLES

Below, a method of manufacturing a layered structure is explained by the examples. The present invention is not limited to those given in the examples.

Example 1

In the present example, the layered structure of a solid electrolyte layer was manufactured.

The particles of $Li_{1.5}Al_{0.5}Ge_{1.5}(PO_4)_3$ that were previously vitrified are prepared as raw powder material for the solid electrolyte material. The particles were then mixed with an organic solvent and made into slurry.

Next, the slurry is cast by the doctor blade method and a green sheet for a solid electrolyte with a thickness of 500 μm was prepared. Then this green sheet for a solid electrolyte was formed into a circular shape having a diameter of 11.28 mm.

Then, a film of an organic compound having the concavities and convexities that were formed was prepared so that it had the same size as the green sheet for a solid electrolyte. This film of the organic compound was produced from polyvinyl alcohol, where after the polyvinyl alcohol had been dissolved in hot water and made a solvent, which was then applied to a die having a concavity and a convexity, it was heated, dried, and made into a film. The strength of the polyvinyl alcohol was improved by having the polyvinyl alcohol cross-linked by adding a small amount of citric acid in the step of producing the solvent. The film of the organic compound was manufactured to have a thickness of 500 μm at its thinnest part and to have a height of the convex part being 100 μm. The concavities and convexities made a striped pattern consisting of the shapes of rectangles in the cross section in a plane that is set vertical along the direction of the movement of the sheet member or in the cross section in a plane that is set vertical in the direction that is perpendicular to the movement of the sheet member, where the width of the convex part was 200 μm and the width of the concave part was 150 μm.

Next, the green sheet for a solid electrolyte was placed in the space for treating a workpiece in the press, sandwiched between two sheets of films of the organic compound, and pressurized by the press that was driven by a servomotor. The space for treating a workpiece was formed by an upper die and a lower die, each having the shape of a column, and by a die that had a cylindrical shape and that guided the upper die and the lower die. The films of the organic compound were placed so that the plain surfaces of the films contacted the upper die and the lower die and the surfaces having concavities and convexities contact the green sheet for a solid electrolyte. The cylindrical die had an inner diameter of 11.30 mm, the pressing force was 500 kgf/cm2, and the time for pressing was 60 seconds.

The films of the organic compound and the green sheet for a solid electrolyte that were formed in one piece by being pressurized by the press were taken out from the press and sintered in a heating and sintering furnace. The conditions for sintering were the following: sintered for 50 hours at temperature of 700° C. and in an argon atmosphere. In this step of heating, the films of the organic compound produced from polyvinyl alcohol were decomposed and disappeared, leaving only the green sheet for a solid electrolyte that was sintered.

By these steps, the layered structure of a solid electrolyte layer that has the concavities and convexities that were formed and that can be applied to the all-solid-state battery was manufactured.

Example 2

In the present embodiment the positive electrode active material layer and the negative electrode active material layer were manufactured.

For the materials that were used for the positive electrode active material layer and the negative electrode active material layer, crystal powder $Li_3V_2(PO_4)_3$ that was prepared in advance was used. This raw powder material was mixed with an organic solvent and was prepared into slurry.

Next, the slurry was cast by the doctor blade method and a green sheet for positive electrode active material and a green sheet for negative electrode active material, each having a thickness of 1,000 μm, were manufactured. The green sheet for positive electrode active material and the green sheet for negative electrode active material were, thereafter, cut into sheets of a circular shape, each having a diameter of 11.28 mm.

By steps similar to those given in Example 1, the layered structure having the green sheet for positive electrode active material layer and the layered structure having the green sheet for negative electrode active material, each having the concavities and convexities that were formed, which layered structures can be applied to the all-solid-state battery, were manufactured.

Effect of the Embodiments (1) According to the method of manufacturing a layered structure of the all-solid-state battery of the present invention, the layered structure can be manufactured by the following steps:
  in the step of forming a green sheet to prepare the slurry that contains materials that constitute the layered structure that is selected, and to form a green sheet;
  in the step of forming concavities and convexities to form in one piece (1) the green sheet and (2) the sheet member that is made from material that disappears when heated and that has concavities and convexities, and to form the concavities and convexities on the surface of the green sheet; and
  in the step of heating the green sheet to heat (1) the green sheet and (2) the sheet member that were formed in one piece, to have the sheet member disappear, and to sinter the green sheet.

In this way, when the all-solid-state battery is manufactured, the interface between the layered structure that is selected and the layered structure adjoining the one that is selected can have the concavities and convexities. So, the interfacial area can increase and the anchor effect is obtained, leading to the improvement of the interfacial strength. Thus a layered structure that is less likely to cause separation at the interface can be manufactured. Also, because the layered structure has an increased interfacial area, the layered structure that has reduced interfacial resistance can be manufactured.

Also, there is no fear that the yield rate would be lowered, because the green sheet and the sheet member are formed in one piece so that no parting of the metal die from the green sheet is necessary after the concavities and convexities are imparted on the surface of the green sheet, thus causing no cracking of the green sheet, which otherwise would occur when it is parted from the metal die. Further, the sheet member strengthens the green sheet and enables easy handling of the green sheet. So, there is no fear that the yield rate would be lowered because of the cracking of the green sheet. Also, the steps of this manufacturing method are easy to perform such that the cost for manufacturing can be reduced.

(2) According to the apparatus for manufacturing a layered structure of the all-solid-state battery of the present invention, an effect similar to that in (1) is obtained and also the cost of the apparatus can be reduced.

(3) The solid-state battery that has the layered structure that is manufactured by the method of manufacturing a layered structure of the present invention has an improved interfacial strength and thus is reliable. The battery has reduced interfacial resistance and shows high performance.

Other Embodiments

Figure 7:
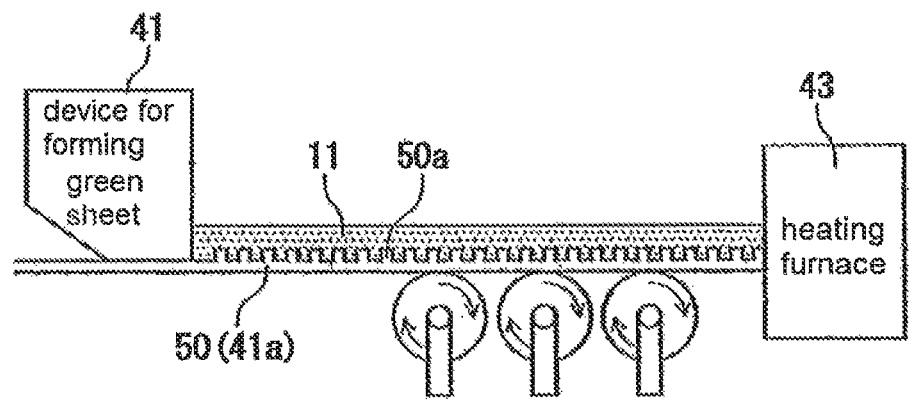
FIG. 7 is a schematic view showing a modified step of forming a carrier sheet by the doctor blade method.

In the above embodiments, in the sub-step of forming a green sheet S111, after the green sheet for a solid electrolyte 11 is manufactured by the doctor blade method with the device for forming a green sheet for a solid electrolyte 41, the green sheet for a solid electrolyte 11 is peeled off from the carrier sheet 41a and supplied to the pressing device 42. Then in the sub-step for forming concavities and convexities S112, the sheet members 50 are pressed onto the green sheet for a solid electrolyte 11, whereby the green sheet for a solid electrolyte 11 and the sheet members 50 are made into one piece. But as shown in FIG. 7, the sheet member 50 can be used as the carrier sheet 41a. By this method the green sheet for a solid electrolyte 11 can be formed at the same time that the concavities and convexities are formed on the green sheet. So, the step of forming a green sheet S111 and the sub-step for forming concavities and convexities S112 can be carried out simultaneously such that the method can be carried out efficiently without having the sheet member 50 separately prepared. Thus the method can reduce the manufacturing cost.

In the above embodiment a continuous press, such as a roll press, belt press, etc., that is suitable for high speed mass production and that can reduce the cost of manufacturing the all-solid-state battery, was used as a pressing device 42. But a batch-type press can also be used. The batch-type press can be purchased cheaply and is suitable for producing a small number of trial samples. Also, the precise adjustment and the precise control of the pressure of the pressing, the precise adjustment and control of the position of the press and the historical management of the operation, are easily carried out.

Figure 8:
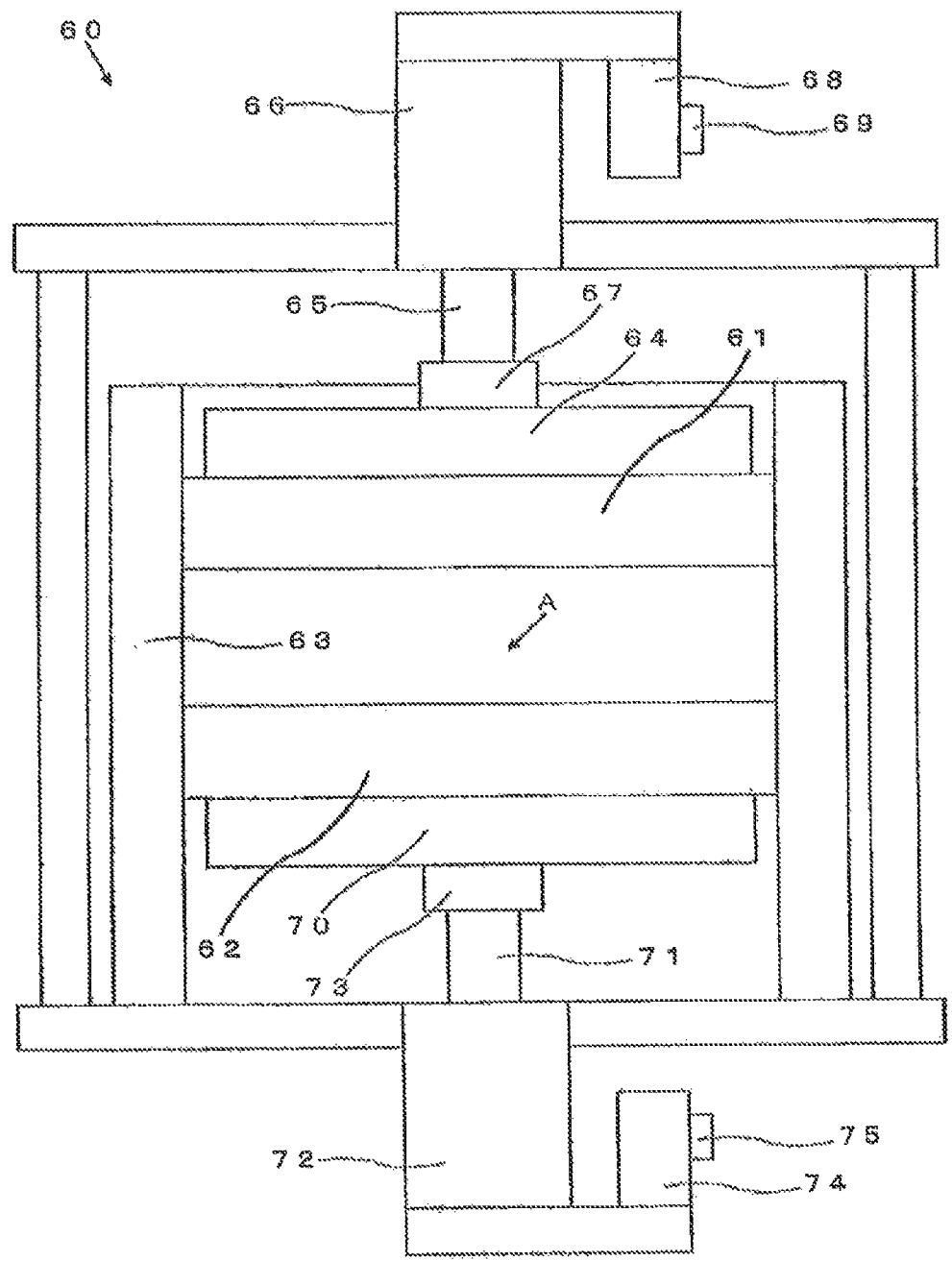
FIG. 8 is a schematic view showing the press that is used in the step of forming concavities and convexities.

An example of a batch-type press is shown in FIG. 8. The press 60 comprises an upper die 61, a lower die 62, a die 63 that guides the upper die 61 and the lower die 62, a pressurizing plate 64 that holds the upper die 61, a rod 65 that moves the pressurizing plate 64 along a pressurizing axis, an electrically driven cylinder 66 that moves the rod 65 in the direction of the pressurizing axis, a load detector 67 that measures the load that is charged on the upper die 61 and that is connected to the rod 65, a servomotor 68 that drives the electrically driven cylinder 66, a position detector 69 as represented by an encoder attached to the servomotor 68, a pressurizing plate 70 that holds the lower die 62, a rod 71 that moves the pressurizing plate 70 in the direction of the pressurizing axis, an electrically driven cylinder 72 that moves the rod 71 in the direction of the pressurizing axis, a load detector 73 that is connected to the rod 71 and that detects the load that is charged on the lower die 62, a servomotor 74 that drives the electrically driven cylinder 72, and a position detector 75 as represented by an encoder attached to the servomotor 74, wherein a space A for treating a workpiece is formed by the upper die 61, the lower die 62, and the die 63.

The layered structure of the all-solid-state battery is manufactured so that it usually has a thickness of 2,000 μm or less. In manufacturing a layered structure, a highly accurate control of the thickness is required. The press that is driven by a servomotor can very accurately control the load and the position, and it is suitable for manufacturing a layered structures.

Also, a press that is driven by oil hydraulic pressure can be used. If the hydraulic press is used, a very high pressure load can be obtained and the cost of the press can be minimized. If the layered structure of the present invention is manufactured under a high pressurizing force, the density of the layered structure can be improved and as a result the performance of the all-solid-state battery can be improved.

The basic Japanese Patent Application, No. 2010-235691, filed Oct. 20, 2010, is hereby incorporated in its entirety by reference in the present application.

The present invention will become more fully understood from the detailed description of this specification. However, the detailed description and the specific embodiment illustrate desirable embodiments of the present invention and are described only for the purpose of explanation. Various changes and modifications will be apparent to those of ordinary skills in the art on the basis of the detailed description.

The applicant has no intention to dedicate to the public any disclosed embodiments. Among the disclosed changes and modifications, those that may not literally fall within the scope of the present claims constitute, therefore, a part of the present invention in the sense of the doctrine of equivalents.

The use of the articles "a," "an," and "the," and similar referents in the specification and claims, are to be construed to cover both the singular and the plural, unless otherwise indicated herein or clearly contradicted by the context. The use of any and all examples, or exemplary language (e.g., "such as," etc.) provided herein, is intended merely to better illuminate the invention and does not pose a limitation on the scope of the invention unless otherwise claimed.

SYMBOLS 1. all-solid-state battery
10. solid electrolyte layer
10a. layered structure of a solid electrolyte layer
11. green sheet for a solid electrolyte
20. positive electrode active material layer
21. current-collector layer for a positive electrode
22. green sheet for positive electrode active material
30. negative electrode active material layer
31. current-collector layer for a negative electrode
32. green sheet for negative electrode active material
40. apparatus for manufacturing an all-solid-state battery
41. device for forming a green sheet for a solid electrolyte
41a. carrier sheet 42. pressing device
43. heating furnace
44. device for forming a green sheet for positive electrode active material
45. device for forming a green sheet for negative electrode active material
46. laminating equipment
47. sintering furnace
50. sheet member
50a. convex part
S111 sub-step of forming a green sheet
S112 sub-step of forming concavities and convexities
S113 sub-step of heating

The invention claimed is:

1. A method of manufacturing a layered structure the method comprising the steps of:

forming a green sheet where slurry is prepared that comprises materials constituting the layered structure that is selected from a solid electrolyte layer, a positive electrode active material layer and a negative electrode active material layer, that together constitute an all-solid-state battery and the green sheet is formed;

forming concavities and convexities on the surface of the green sheet where (1) the green sheet that was formed in the step of forming a green sheet and (2) a sheet member that is made up of material that is caused to disappear when heated, and that has concavities and convexities, are formed in one piece along a direction of movement, and the concavities and convexities are formed on the surface of the green sheet; and heating the green sheet and the sheet member that are formed in one piece in the step of forming concavities and convexities, where the sheet member is caused to disappear by heating and where the green sheet is sintered, wherein the concavities and convexities of the layered structure that are formed by the sheet member being caused to disappear by heating have a shape of a striped pattern that consists of rectangles when seen at a cross section in the plane that is set vertically along the direction of movement of the sheet member.

2. The method of manufacturing the layered structure of claim 1, wherein the sheet member is made from resin materials.

3. The method of manufacturing the layered structure of claim 1 or 2, wherein the green sheet and the sheet member are formed in one piece by the sheet member being pressed onto the green sheet in the step of forming concavities and convexities.

4. The method of manufacturing the layered structure of claim 1 or 2, wherein the green sheet is manufactured by a doctor blade method in the step of forming a green sheet.

5. The method of manufacturing the layered structure of claim 4, wherein the sheet member is a carrier sheet that is used in the doctor blade method.

6. The method of manufacturing the layered structure of claim 1 or 2, wherein the concavities and convexities formed on the surface of the green sheet have an undercut shape.

7. The all-solid-state battery comprising the layered structure manufactured by the method of manufacturing the layered structure of claim 1 or 2.

8. An apparatus for manufacturing a layered structure that is selected from a solid electrolyte layer, a positive electrode active material layer, and a negative electrode active material layer, which together constitute an all-solid-state battery, comprising a device for forming concavities and convexities, which means forms in one piece along a direction of movement (1) a green sheet that is to form material that constitutes the layered structure that is selected and (2) a sheet member that is made from material that is caused to disappear when heated, and that has concavities and convexities, and which means forms the concavities and convexities on the surface of the green sheet, wherein the concavities and convexities of the layered structure that are formed by the sheet member being caused to disappear by heating have a shape of a striped pattern that consists of rectangles when seen at a cross section in the plane that is set vertically along the direction of movement of the sheet member.

9. The apparatus for manufacturing the layered structure of claim 8, wherein the means for forming concavities and convexities forms the green sheet and the sheet member in one piece by pressing the sheet member to the green sheet.

10. The apparatus for manufacturing the layered structure of claim 8, wherein the apparatus comprises a means for forming a green sheet, which means forms the green sheet by a doctor blade method and wherein the sheet member used in the method is a carrier sheet that is used in the doctor blade method.

* * * * *